(12) United States Patent
Lan

(10) Patent No.: US 9,035,586 B2
(45) Date of Patent: May 19, 2015

(54) MOTOR DRIVING DEVICE FOR PROTECTING INRUSH CURRENT

(71) Applicant: DELTA ELECTRONICS, INC., Taoyuan Hsien (TW)

(72) Inventor: Wen-Han Lan, Taoyuan Hsien (TW)

(73) Assignee: DELTA ELECTRONICS, INC., Taoyuan Hsien (TW)

( * ) Notice: Subject to any disclaimer, the term of this patent is extended or adjusted under 35 U.S.C. 154(b) by 177 days.

(21) Appl. No.: 13/761,171

(22) Filed: Feb. 7, 2013

(65) Prior Publication Data

US 2013/0300326 A1 Nov. 14, 2013

(30) Foreign Application Priority Data

May 9, 2012 (TW) .............................. 101116443 A

(51) Int. Cl.
*H02H 7/09* (2006.01)
*H02P 6/14* (2006.01)
*H02P 27/06* (2006.01)
*H02M 5/44* (2006.01)
*H02M 1/32* (2007.01)
*H02M 5/458* (2006.01)
*H02H 9/00* (2006.01)

(52) U.S. Cl.
CPC *H02P 6/14* (2013.01); *H02P 27/06* (2013.01); *H02M 5/44* (2013.01); *H02M 1/32* (2013.01); *H02M 5/458* (2013.01); *H02H 9/001* (2013.01)

(58) Field of Classification Search
USPC .................. 318/400.01, 400.21, 400.22, 700
See application file for complete search history.

(56) References Cited

U.S. PATENT DOCUMENTS

| 5,034,669 | A | * | 7/1991 | Sako et al. ..................... 318/376 |
| 7,042,178 | B2 | * | 5/2006 | Yamada et al. ............... 318/376 |
| 7,050,278 | B2 | | 5/2006 | Poulsen |
| 7,068,010 | B2 | * | 6/2006 | Youm .......................... 318/778 |
| 2004/0136133 | A1 | * | 7/2004 | Youm .......................... 361/91.1 |
| 2004/0246641 | A1 | * | 12/2004 | Sugimoto et al. ............ 361/91.1 |
| 2010/0321965 | A1 | * | 12/2010 | Sakakibara .................... 363/37 |
| 2011/0007531 | A1 | * | 1/2011 | Sakakibara .................... 363/37 |
| 2013/0201732 | A1 | * | 8/2013 | Barauna ........................ 363/37 |

FOREIGN PATENT DOCUMENTS

| CN | 2582246 | Y | 10/2003 |
| CN | 101268597 | A | 9/2008 |
| CN | 101917020 | A | 12/2010 |
| CN | 201846090 | U | 5/2011 |
| CN | 202121543 | U | 1/2012 |
| TW | M342691 | U | 10/2008 |

* cited by examiner

*Primary Examiner* — Kawing Chan
(74) *Attorney, Agent, or Firm* — CKC & Partners Co., Ltd.

(57) ABSTRACT

A motor driving device for protecting inrush current is disclosed, where the motor driving device includes a resistor, a capacitor, an electronic switch, a rectifier and a driving circuit. The capacitor is connected to the resistor in series. The electronic switch is connected to the resistor in parallel. The rectifier is connected to the resistor and the capacitor in parallel and is electrically connected to a power source. The driving circuit is connected to the resistor and the capacitor in parallel and is electrically connected to a motor.

11 Claims, 3 Drawing Sheets

MOTOR DRIVING DEVICE FOR PROTECTING INRUSH CURRENT

RELATED APPLICATIONS

This application claims priority to Taiwan Application Serial Number 101116443, filed May 9, 2012, which is herein incorporated by reference.

BACKGROUND

1. Technical Field

The present disclosure relates to an electronic device, and more particularly, a motor driving device for protecting inrush current.

2. Description of Related Art

Recently, with the progression of the industry and commerce and the advancements in human society, the products on the market are aimed to be convenient, accurate, and economical. Therefore, the products that are developed are better than the old products and make contributions to the society.

Generally, a circuit for limiting the surge current is necessary in the design of a motor driver. Conventionally, the input power would be limited to a threshold current value (e.g., 10 A) by a current-limiting resistor. However, in the case where the input current does not flow through a soft-start circuit (for example, if the user erroneously connects the wire), the surge impulse occurred at the time when the current is input would be as high as about 100 A (theoretically, the surge current would be infinity), which is ten-fold to the maximum allowable current of 10 A, and may cause damages to the driver.

In view of the foregoing, there still exist some inconveniences and defects in conventional designs for motor drivers that await further improvement. However, those skilled in the art sought vainly for a solution. In order to solve or circumvent above problems and disadvantages, there is an urgent need in the related field to avoid the effect of the surge current.

SUMMARY

The following presents a simplified summary of the disclosure in order to provide a basic understanding to the reader. This summary is not an extensive overview of the disclosure and it does not identify key/critical elements of the present invention or delineate the scope of the present invention. Its sole purpose is to present some concepts disclosed herein in a simplified form as a prelude to the more detailed description that is presented later.

In one or more various aspects, the present disclosure is directed to a motor driving device for protecting inrush current, so as to solve or circumvent above problems.

According to one embodiment of the present invention, a motor driving device includes a rectifier, a resistor, a capacitor, an electronic switch and a driving circuit. The rectifier has at least one input terminal, a first output terminal and a second output terminal, where the input terminal of the rectifier is electrically connected to a power source. The resistor has a first terminal and a second terminal, where the first terminal of the resistor is in direct contact with the first output terminal of the rectifier. The capacitor has a first terminal and a second terminal, where the first terminal of the capacitor is in direct contact with the second terminal of the resistor, and the second terminal of the capacitor is in direct contact with the second output terminal of the rectifier. The electronic switch is connected to the resistor in parallel, where one end of the electronic switch is in direct contact with the first terminal of the resistor, and another end of the electronic switch is in direct contact with the second terminal of the resistor. The driving circuit has a first input terminal, a second input terminal and at least one output terminal, where the first input terminal of the driving circuit is in direct contact with the first terminal of the resistor, the second input to terminal of the driving circuit is in direct contact with the second terminal of the capacitor, and the output terminal of the driving circuit is in direct contact with a motor.

The motor driving device further includes a voltage detector and a controller. The voltage detector can detect a voltage of the capacitor. The controller can control the electronic switch to serve as an open-circuit when the voltage of the capacitor is lower than a setting voltage value.

The resistor is grounded without through another capacitor.

The motor is connected to a load, and a rated capacity of the capacitor depends on the load.

According to another embodiment of the present invention, a motor driving device includes a rectifier, a first resistor, a first capacitor, a first electronic switch, a driving circuit and a power regeneration unit. The rectifier has at least one input terminal, a first output terminal and a second output terminal, where the input terminal of the rectifier is electrically connected to a power source. The first resistor has a first terminal and a second terminal, where the first terminal of the first resistor is in direct contact with the first output terminal of the rectifier. The first capacitor has a first terminal and a second terminal, where the first terminal of the first capacitor is in direct contact with the second terminal of the first resistor, and the second terminal of the first capacitor is in direct contact with the second output terminal of the rectifier. The first electronic switch is connected to the first resistor in parallel, where one end of the first electronic switch is in direct contact with the first terminal of the first resistor, and another end of the first electronic switch is in direct contact with the second terminal of the first resistor. The driving circuit has a first input terminal, a second input terminal and at least one output terminal, where the first input terminal of the driving circuit is in direct contact with the first terminal of the first resistor, the second input terminal of the driving circuit is in direct contact with the second terminal of the first capacitor, and the output terminal of the driving circuit is in direct contact with a motor. The power regeneration unit has first input terminal, a second input terminal and at least one output terminal, where the first input terminal of the power regeneration unit is electrically connected to the first terminal of the first resistor, the second input terminal of the power regeneration unit is electrically connected to the second terminal of the first capacitor, and the output terminal of the power regeneration unit is electrically connected to the power source.

The motor driving device further includes a first voltage detector and a first controller. The first voltage detector can detect a voltage of the first capacitor. The first controller can control the first electronic switch to serve as an open-circuit when the voltage of the first capacitor is lower than a first setting voltage value.

The first resistor is grounded without through another capacitor.

The power regeneration unit includes a second resistor, a second capacitor, a second electronic switch and a power regeneration circuit. The second resistor has a first terminal and a second terminal, where the first terminal of the second resistor is electrically connected to the first terminal of the first resistor. The second capacitor has a first terminal and a second terminal, where the first terminal of the second capacitor is in direct contact with the second terminal of the second resistor, and the second terminal of the second capacitor is in direct contact with the second terminal of the first capacitor. The second electronic switch is connected to the second resistor in parallel, where one end of the second electronic switch is in direct contact with the first terminal of the second resistor, and another end of the second electronic switch is in direct contact with the second terminal of the second resistor. The power regeneration circuit has first input terminal, a second input terminal and at least one output terminal, where the first input terminal of the power regeneration circuit is in direct contact with the first terminal of the second resistor, the second input terminal of the power regeneration circuit is in direct contact with the second terminal of the second capacitor, and the output terminal of the power regeneration circuit is electrically connected to the power source.

The power regeneration unit further includes a second voltage detector and a second controller. The second voltage detector can detect a voltage of the second capacitor. The second controller can control the second electronic switch to serve as an open-circuit when the voltage of the second capacitor is lower than a second setting voltage value.

The second resistor is grounded without through another capacitor.

The motor is connected to a load, and a rated capacity of the first capacitor depends on the load.

According to yet another embodiment of the present invention, a motor driving device includes a power regeneration circuit, a resistor, a capacitor, an electronic switch and a driving circuit. The power regeneration circuit has first terminal, a second terminal and a third terminal, where the first terminal of the power regeneration circuit is electrically connected to a power source. The resistor has a first terminal and a second terminal, where the first terminal of the resistor is in direct contact with the second terminal of the power regeneration circuit. The capacitor has a first terminal and a second terminal, where the first terminal of the capacitor is in direct contact with the second terminal of the resistor, and the second terminal of the capacitor is in direct contact with the third terminal of the power regeneration circuit. The electronic switch is connected to the resistor in parallel, where one end of the electronic switch is in direct contact with the first terminal of the resistor, and another end of the electronic switch is in direct contact with the second terminal, of the resistor. The driving circuit has a first input terminal, a second input terminal and at least one output terminal, where the first input terminal of the driving circuit is in direct contact with the first terminal of the resistor, the second input terminal of the driving circuit is in direct contact with the second terminal of the capacitor, and the output terminal of the driving circuit is in direct contact with a motor.

The motor driving device further includes a voltage detector and a controller. The voltage detector can detect a voltage of the capacitor. The controller can control the electronic switch to serve as an open-circuit when the voltage of the capacitor is lower than a setting voltage value.

The resistor is grounded without through another capacitor.

The motor is connected to a load, and a rated capacity of the capacitor depends on the load.

Technical advantages are generally achieved, by embodiments of the present invention, as follows:

1. Compared with the conventional circuit design, the present invention uses fewer components without adding extra components. The positions of the resistors and the switches are arranged to achieve the erroneous connection protection; and 2. The impact of the surge current is avoided effectively.

Many of the attendant features will be more readily appreciated, as the same becomes better understood by reference to the following detailed description considered in connection with the accompanying drawings.

BRIEF DESCRIPTION OF THE DRAWINGS

The present description will be better understood from the following detailed description read in light of the accompanying drawing, wherein.

DETAILED DESCRIPTION

Figure 1:
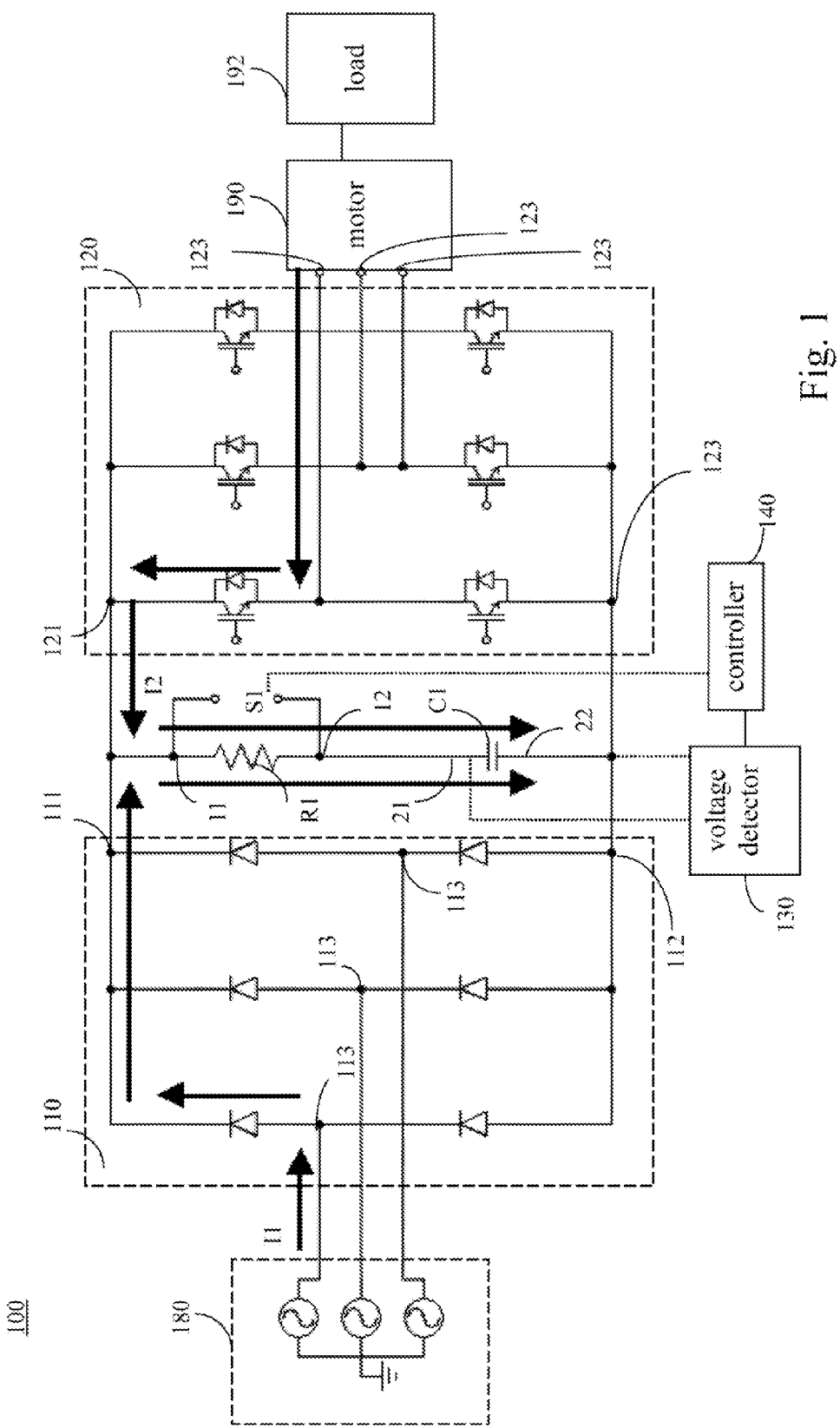
FIG. 1 is a circuit diagram of a motor driving device according to one embodiment of the present disclosure.

In the following detailed description, for purposes of explanation, numerous specific details are set forth in order to attain a thorough understanding of the disclosed embodiments. It will be apparent, however, that one or more embodiments may be practiced without these specific details. In other instances, well-known structures and devices are schematically shown in order to simplify the drawing.

In one aspect, the present disclosure is directed to a motor driving device. This device may be easily inserted into a frequency conversion motor driver and may be applicable or readily adaptable to all technologies. It should be noted that the motor driving device could avoid the impact of the surge current effectively. Herewith the motor control device is illustrated by reference to the following description considered in FIGS. 1-3.

FIG. 1 is a circuit diagram of a motor driving device 100 according to one embodiment of the present disclosure. As shown in FIG. 1, the motor driving device 100 includes a resistor R1, a capacitor C1, an electronic switch S1, a rectifier 110 and a driving circuit 120.

In FIG. 1, the capacitor C1 is connected to the resistor R1 in series. The electronic switch S1 is connected to the resistor R1 in parallel. The rectifier 110 is connected to the resistor R1 and the capacitor C1 in parallel and is electrically connected to a power source 180. The driving circuit 120 is connected to the resistor R1 and the capacitor C1 in parallel and is electrically connected to a motor 190.

Specifically, the rectifier 110 has a first output terminal 111, a second output terminal 112, and input terminals 113, where the input terminals 113 of the rectifier are electrically connected to the power source 180. The resistor has a first terminal 11 and a second terminal 12, where the first terminal 11 of the resistor R1 is in direct contact with the first output terminal 111 of the rectifier 110. The capacitor C1 has a first terminal 21 and a second terminal 22, where the first terminal 21 of the capacitor C1 is in direct contact with the second terminal 12 of the resistor R1, and the second terminal 22 of the capacitor is in direct contact with the second output terminal 112 of the rectifier to 110. The electronic switch S1 is connected to the resistor in parallel, where one end of the electronic switch S1 is in direct contact with the first terminal 11 of the resistor R1, and another end of the electronic switch S1 is in direct contact with the second terminal 12 of the resistor R1. The driving circuit 120 has a first input terminal 121, a second input terminal 122 and output terminals 123, where the first input terminal 121 of the driving circuit 120 is in direct contact with the first terminal 11 of the resistor R1, the second input terminal 122 of the driving circuit is in direct contact with the second terminal 22 of the capacitor C1, and the output terminal 123 of the driving circuit 120 is in direct contact with the motor 190.

In use, the rectifier 110 converts alternating current from the power source 180 into direct current. The resistor R1 can be a current-limiting resistor. The capacitor C1 can be a filter capacitor for filtering out ripples of the direct current, and then the driving circuit 120 can drive the motor 190. Moreover, on/off states of the electronic switch S1 can be controlled to avoid the impact of the surge current.

In addition, the motor driving device 100 further includes a voltage detector 130 and a controller 140. The voltage detector 130 is electrically connected to the capacitor C1 and the controller 140. The controller 140 is electrically connected to the electronic switch S1.

In use, the voltage detector 130 can detect a voltage of the capacitor C1. The controller 140 can control the electronic switch S1 to serve as an open-circuit when the voltage of the capacitor C1 is lower than a setting voltage value. In this way, when the power source 180 starts to supply electric power, the voltage of the capacitor C1 is relative low, and the electronic switch S1 is open-circuit, so that the electric current flows to the resistor R1 and charges the capacitor C1.

In practice, the resistor R1 is grounded without through another capacitor. In other words, filtration can be performed by only one capacitor C1 without adding extra impedance components, so as to reduce the number of components and circumvent complex design.

In FIG. 1, the power source 180 is a three-phase power source, and the motor 190 is a three-phase motor. The driving circuit 120 can be composed of insulating gate bipolar transistors (IGBTs) and diodes. Since the IGBT has the characteristic of high efficiency and fast switching speed, the motor 190 can be driven effectively.

The driving circuit 120 is connected to the motor 190, the motor 190 is connected to a load 192, and a rated capacity of the capacitor C1 depends on the load 192. In practice, those with ordinary skill in the art may choose a specific value of the rated capacity of the capacitor C1 depending on the impedance of the load 192.

Figure 2:
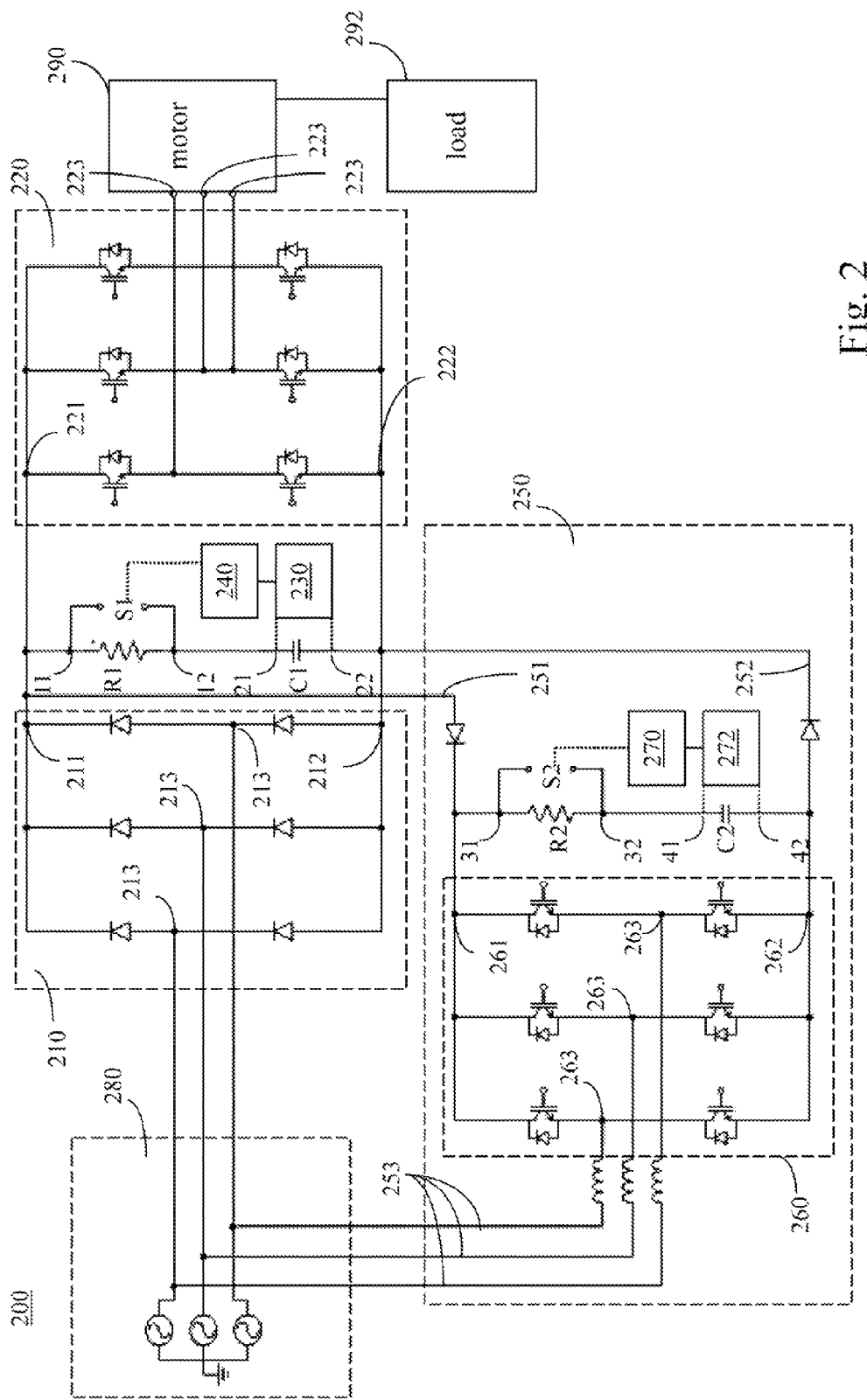
FIG. 2 is a circuit diagram of a motor driving device according to another embodiment of the present disclosure.

FIG. 2 is a circuit diagram of a motor driving device 200 according to another embodiment of the present disclosure. As shown in FIG. 2, the motor driving device 200 includes a first resistor R1, a first capacitor C1, a first electronic switch S1, a rectifier 210, a driving circuit 220 and a power regeneration unit 250.

In FIG. 2, the first capacitor C1 is connected to the first resistor R1 in series. The first electronic switch S1 is connected to the first resistor R1 in parallel. The rectifier 210 is connected to the resistor R1 and the capacitor C1 in parallel and is electrically connected to a power source 280. The driving circuit 220 is connected to the first resistor R1 and the first capacitor C1 in parallel and is electrically connected to a motor 190. The power regeneration unit 250 is connected to the first resistor R1 and the first capacitor C1 in parallel and is electrically connected to the power source 280.

Specifically, the rectifier 210 has first output terminal 211, a second output terminal 212 and input terminals 213, where the input terminal 213 of the rectifier 210 is electrically connected to the power source 280. The first resistor R1 has a first terminal 11 and a second terminal 12, where the first terminal 11 of the first resistor R1 is in direct contact with the first output terminal 211 of the rectifier 210. The first capacitor C1 has a first terminal 21 and a second terminal 22, where the first terminal 21 of the first capacitor C1 is in direct contact with the second terminal 12 of the first resistor R1, and the second terminal 22 of the first capacitor C1 is in direct contact with the second output terminal 212 of the rectifier 210. The first electronic switch S1 is connected to the first resistor R1 in parallel, where one end of the first electronic switch S1 is in direct contact with the first terminal 11 of the first resistor R1, and another end of the first electronic switch S1 is in direct contact with the second terminal 12 of the first resistor R1. The driving circuit 220 has a first input terminal 221, a second input terminal 222 and output terminals 223, where the first input terminal 221 of the driving circuit 220 is in direct contact with the first terminal 11 of the first resistor C1, the second input terminal 222 of the driving circuit 220 is in direct contact with the second terminal 22 of the first capacitor C1, and the output terminals 223 of the driving circuit 220 is in direct contact with the motor 290. The power regeneration unit 250 has first input terminal 251, a second input terminal 252 and at least one output terminal 253, where the first input terminal 251 of the power regeneration unit 250 is electrically connected to the first terminal 11 of the first resistor R1, the second input terminal 252 of the power regeneration unit 250 is electrically connected to the second terminal 22 of the first capacitor C1, and the output terminal 253 of the power regeneration unit 250 is electrically connected to the power source 290.

In use, the rectifier 210 converts alternating current from the power source 280 into direct current. The resistor R1 can be a current-limiting resistor. The capacitor C1 can be a filter capacitor for filtering out ripples of the direct current, and then the driving circuit 220 can drive the motor 290.

In addition, the motor driving device 200 further includes a first voltage detector 230 and a first controller 240. The first voltage detector 230 is electrically connected to the first capacitor C1 and the first controller 240. The first controller 240 is electrically connected to the first electronic switch S1.

In use, the first voltage detector 230 can detect a voltage of the first capacitor C1. The first controller 240 can control the first electronic switch S1 to serve as an open-circuit when the voltage of the first capacitor C1 is lower than a setting voltage value. In this way, when the power source 280 starts to supply electric power, the voltage of the first capacitor C1 is relative low, and the first electronic switch S1 is open-circuit, so that the electric current flows to the first resistor R1 and charges the first capacitor C1.

In practice, the first resistor R1 is grounded without through another capacitor. In other words, filtration can be performed by only one first capacitor C1 without adding extra impedance components, so as to reduce the number of components and circumvent complex design.

In FIG. 2, the power source 280 is a three-phase power source, and the motor 290 is a three-phase motor. The driving circuit 220 can be composed of insulating gate bipolar transistors (IGBTs) and diodes. Since the IGBTs have the characteristic of high efficiency and fast switching speed, the motor 290 can be driven effectively.

The power regeneration unit 250 includes a second resistor R2, a second capacitor C2, a second electronic switch 52 and a power regeneration circuit 260. The second capacitor C2 is connected to the second resistor R2 in series, where the second resistor R2 and the second capacitor C2 are connected to the rectifier 210 in parallel. The second electronic switch 52 is connected to the second resistor R2 in parallel. The power regeneration circuit 260 is connected to the second resistor R2 and the second capacitor C2 in parallel and is electrically connected to the power source 280.

Specifically, the second resistor R2 has a first terminal 31 and a second terminal 41, where the first terminal 31 of the second resistor R2 is electrically connected to the first terminal 11 of the first resistor R1. The second capacitor C2 has a first terminal 41 and a second terminal 42, where the first terminal 41 of the second capacitor C2 is in direct contact with the second terminal 22 of the second resistor R2, and the second terminal 42 of the second capacitor C2 is in direct contact with the second terminal 22 of the first capacitor C1. The second electronic switch S2 is connected to the second resistor R2 in parallel, where one end of the second electronic switch S2 is in direct contact with the first terminal 31 of the second resistor R2, and another end of the second electronic switch S2 is in direct contact with the second terminal 32 of the second resistor R2. The power regeneration circuit 260 has first input terminal 261, a second input terminal 262 and output terminals 263, where the first input terminal 261 of the power regeneration circuit 260 is in direct contact with the first terminal 31 of the second resistor R2, the second input terminal 262 of the power regeneration circuit 260 is in direct contact with the second terminal 42 of the second capacitor C2, and the output terminals 263 of the power regeneration circuit are electrically connected to the power source 280.

In addition, the power regeneration unit 250 further includes a second voltage detector 272 and a second controller 270. The second voltage detector 272 is electrically connected to the second capacitor C2 and the second controller 270. The second controller 270 is electrically connected to the first electronic switch S2.

The second voltage detector 272 can detect a voltage of the second capacitor C2. The second controller 270 can control the second electronic switch S2 to serve as an open-circuit when the voltage of the second capacitor C2 is lower than a second setting voltage value. In this way, when the surge current occurs, the surge current flows to a pathway of the second resistor R2, so as to prevent an adverse effect on the pre-stage circuit.

In practice, the second resistor R2 is grounded without through another capacitor. In other words, filtration can be performed by only one capacitor C2 without adding extra impedance components, so as to reduce the number of components and circumvent complex design.

The power regeneration circuit 260 can be composed of IGBTs and diodes. Since the IGBTs have the characteristic of high efficiency and fast switching speed, the electric power can be fed back to the power source 280 effectively.

The motor 290 is connected to a load 292, and a rated capacity of the first capacitor C1 depends on the load 292. In practice, those with ordinary skill in the art may choose a specific value of the rated capacity of the first capacitor C1 depending on the impedance of the load 292.

Figure 3:
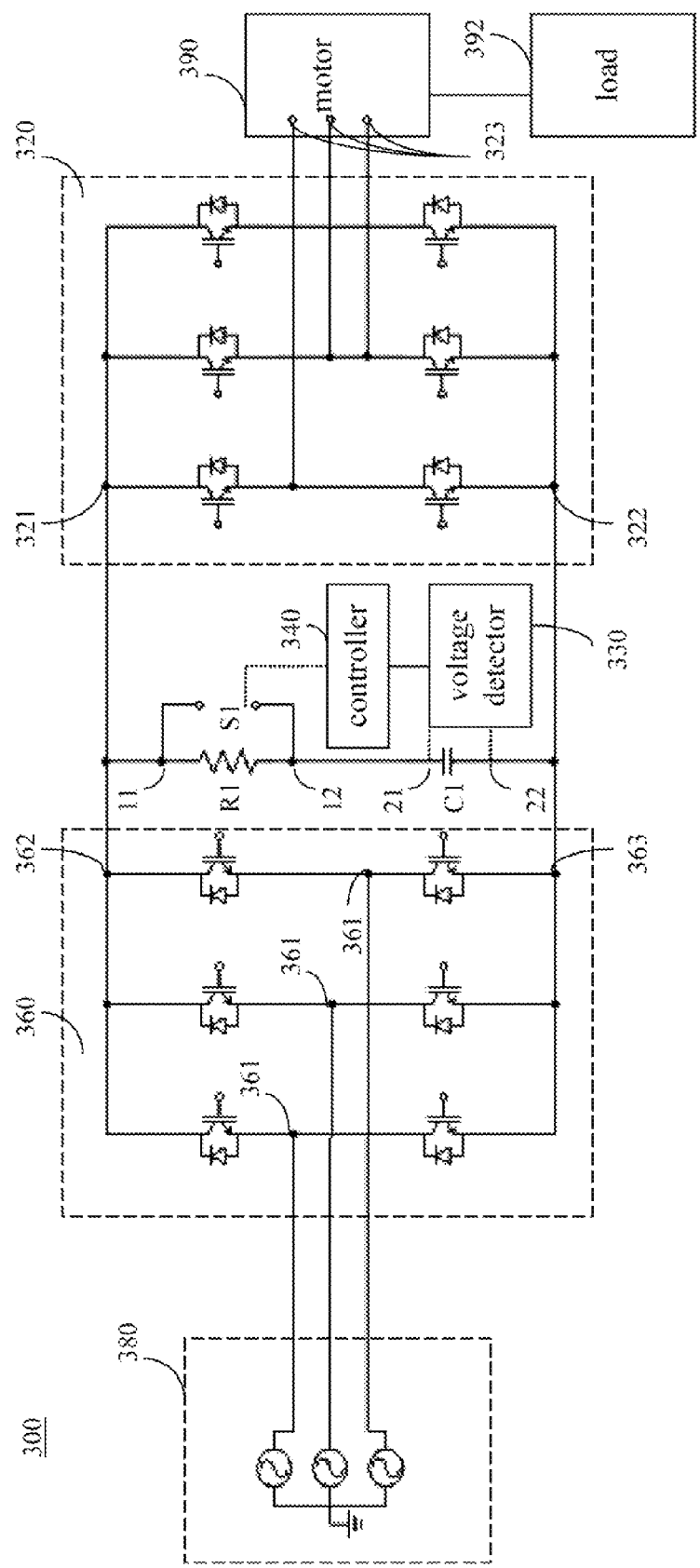
FIG. 3 is a circuit diagram of a motor driving device according to yet another embodiment of the present disclosure.

FIG. 3 is a circuit diagram of a motor driving device 300 according to yet another embodiment of the present disclosure. As shown in FIG. 3, the motor driving device 300 includes a resistor R1, a capacitor C1 and an electronic switch S1, a power regeneration circuit 360 and a driving circuit 320.

In FIG. 3, the capacitor C1 is connected to the resistor R1 in series. The electronic switch S1 is connected to the resistor R1 in parallel. The power regeneration circuit 360 is connected to the resistor R1 and the capacitor C1 in parallel and is electrically connected to a power source 380. The driving circuit 120 is connected to the resistor R1 and the capacitor C1 in parallel and is electrically connected to a motor 390.

Specifically, the power regeneration circuit 360 has first terminal 361, a second terminal 362 and a third terminal 363, where the first terminal 361 of the power regeneration circuit 360 is electrically connected to the power source 380. The resistor R1 has a first terminal 11 and a second terminal 12, where the first terminal 11 of the resistor R1 is in direct contact with the second terminal 362 of the power regeneration circuit 360. The capacitor C1 has a first terminal 21 and a second terminal 22, where the first terminal 21 of the capacitor C1 is in direct contact with the second terminal 12 of the resistor R1, and the second terminal 22 of the capacitor C1 is in direct contact with the third terminal 363 of the power regeneration circuit 360. The electronic switch S1 is connected to the resistor R1 in parallel, where one end of the electronic switch S1 is in direct contact with the first terminal 11 of the resistor R1, and another end of the electronic switch S1 is in direct contact with the second terminal 12 of the resistor R1. The driving circuit 320 has a first input terminal 321, a second input terminal 322 and at least one output terminal 323, where the first input terminal 321 of the driving circuit 320 is in direct contact with the first terminal 11 of the resistor R1, the second input terminal 322 of the driving circuit 320 is in direct contact with the second terminal 22 of the capacitor C1, and the output terminals 323 of the driving circuit 320 is in direct contact with the motor 390.

In addition, the motor driving device 300 further includes a voltage detector 330 and a controller 340. The voltage detector 330 is electrically connected to the capacitor C1 and the controller 340. The controller 340 is electrically connected to the electronic switch S1.

In use, the voltage detector 330 can detect a voltage of the capacitor C1. The controller 340 can control the electronic switch S1 to serve as an open-circuit when the voltage of the capacitor C1 is lower than a setting voltage value. In this way, when the power source 380 starts to supply electric power, the voltage of the capacitor C1 is relative low, and the electronic switch S1 is open-circuit, so that the electric current flows to the resistor R1 and charges the capacitor C1.

In practice, the resistor R1 is grounded without through another capacitor. In other words, filtration can be performed by only one capacitor C1 without adding extra impedance components, so as to reduce the number of components and circumvent complex design.

The power regeneration circuit 360 can be composed of insulating gate bipolar transistors (IGBTs) and diodes. Since the IGBT has the characteristic of high efficiency and fast switching speed, the electric power can be fed back to the power source 380 effectively.

The motor 390 is connected to a load 392, and a rated capacity of the capacitor C1 depends on the load 392. In practice, those with ordinary skill in the art may choose a specific value of the rated capacity of the capacitor C1 depending on the impedance of the load 392.

The motor driving device further includes a voltage detector and a controller. The voltage detector can detect a voltage of the capacitor. The controller can control the electronic switch to serve as an open-circuit when the voltage of the capacitor is lower than a setting voltage value.

The resistor is grounded without through another capacitor.

The motor is connected to a load, and a rated capacity of the capacitor depends on the load.

The electronic switches S1 and S2 may be transistors, such as bipolar junction transistors, metal-oxide-semiconductors or the like. Those with ordinary skill in the art may choose suitable transistors depending on the desired application.

The controller 140, 240, 270 and 340 may be hardware, software, and/or firmware. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

The reader's attention is directed to all papers and documents which are filed concurrently with his specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. §112, 6th paragraph. In particular, the use of "step of" in the claims herein is not intended to invoke the provisions of 35 U.S.C. §112, 6th paragraph.

What is claimed is:

1. A motor driving device comprising:
   a rectifier having at least one input terminal, a first output terminal and a second output terminal, the input terminal of the rectifier electrically connected to a power source;
   a first resistor having a first terminal and a second terminal, the first terminal of the first resistor being in direct contact with the first output terminal of the rectifier;
   a first capacitor having a first terminal and a second terminal, the first terminal of the first capacitor being in direct contact with the second terminal of the first resistor, the second terminal of the first capacitor being in direct contact with the second output terminal of the rectifier;
   a first electronic switch connected to the first resistor in parallel, wherein one end of the first electronic switch is in direct contact with the first terminal of the first resistor, and another end of the first electronic switch is in direct contact with the second terminal of the first resistor;
   a driving circuit having a first input terminal, a second input terminal and at least one output terminal, the first input terminal of the driving circuit being in direct contact with the first terminal of the first resistor, the second input terminal of the driving circuit being in direct contact with the second terminal of the first capacitor, the output terminal of the driving circuit being in direct contact with a motor; and
   a power regeneration unit having first input terminal, a second input terminal and at least one output terminal, the first input terminal of the power regeneration unit electrically connected to the first terminal of the first resistor, the second input terminal of the power regeneration unit electrically connected to the second terminal of the first capacitor, the output terminal of the power regeneration unit electrically connected to the power source.

2. The motor driving device of claim 1, further comprising:
   a first voltage detector for detecting a voltage of the first capacitor; and
   a first controller for controlling the first electronic switch to serve as an open-circuit when the voltage of the first capacitor is lower than a first setting voltage value.

3. The motor driving device of claim 1, wherein the first resistor is grounded without through another capacitor.

4. The motor driving device of claim 1, wherein the power regeneration unit comprises:
   a second resistor having a first terminal and a second terminal, the first terminal of the second resistor electrically connected to the first terminal of the first resistor;
   a second capacitor having a first terminal and a second terminal, the first terminal of the second capacitor being in direct contact with the second terminal of the second resistor, the second terminal of the second capacitor being in direct contact with the second terminal of the first capacitor;
   a second electronic switch connected to the second resistor in parallel, wherein one end of the second electronic switch is in direct contact with the first terminal of the second resistor, and another end of the second electronic switch is in direct contact with the second terminal of the second resistor; and
   a power regeneration circuit having first input terminal, a second input terminal and at least one output terminal, the first input terminal of the power regeneration circuit being in direct contact with the first terminal of the second resistor, the second input terminal of the power regeneration circuit being in direct contact with the second terminal of the second capacitor, the output terminal of the power regeneration circuit electrically connected to the power source.

5. The motor driving device of claim 4, wherein the power regeneration unit further comprises:
   a second voltage detector for detecting a voltage of the second capacitor; and
   a second controller for controlling the second electronic switch to serve as an open-circuit when the voltage of the second capacitor is lower than a second setting voltage value.

6. The motor driving device of claim 4, wherein the second resistor is grounded without through another capacitor.

7. The motor driving device of claim 1, wherein the motor is connected to a load, and a rated capacity of the first capacitor depends on the load.

8. A motor driving device comprising:
   a power regeneration circuit having first terminal, a second terminal and a third terminal, the first terminal of the power regeneration circuit electrically connected to a power source;
   a resistor having a first terminal and a second terminal, the first terminal of the resistor being in direct contact with the second terminal of the power regeneration circuit;
   a capacitor having a first terminal and a second terminal, the first terminal of the capacitor being in direct contact with the second terminal of the resistor, the second terminal of the capacitor being in direct contact with the third terminal of the power regeneration circuit;
   an electronic switch connected to the resistor in parallel, wherein one end of the electronic switch is in direct contact with the first terminal of the resistor, and another end of the electronic switch is in direct contact with the second terminal of the resistor; and
   a driving circuit having a first input terminal, a second input terminal and at least one output terminal, the first input terminal of the driving circuit being in direct contact with the first terminal of the resistor, the second input terminal of the driving circuit being in direct contact with the second terminal of the capacitor, the output terminal of the driving circuit being in direct contact with a motor.

9. The motor driving device of claim 8, further comprising:
a voltage detector for detecting a voltage of the capacitor; and
a controller for controlling the electronic switch to serve as an open-circuit when the voltage of the capacitor is lower than a setting voltage value.

10. The motor driving device of claim 8, wherein the resistor is grounded without through another capacitor.

11. The motor driving device of claim 8, wherein the motor is connected to a load, and a rated capacity of the capacitor depends on the load.

* * * * *